US012567765B2

(12) United States Patent
Ghamari et al.

(10) Patent No.: US 12,567,765 B2
(45) Date of Patent: Mar. 3, 2026

(54) INPUT CIRCUIT FOR A WIRELESS POWER RECEIVER, WIRELESS POWER RECEIVER, AND METHOD FOR OPERATING THE WIRELESS POWER RECEIVER

(71) Applicant: Semtech Corporation, Camarillo, CA (US)

(72) Inventors: Saeed Ghamari, Neuchâtel (CH); Eric Vandel, Concise (CH)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 18/443,954

(22) Filed: Feb. 16, 2024

(65) Prior Publication Data

US 2024/0291321 A1     Aug. 29, 2024

(30) Foreign Application Priority Data

Feb. 24, 2023     (EP) .................................... 23158629

(51) Int. Cl.
*H02J 50/12*            (2016.01)
(52) U.S. Cl.
CPC .................................. *H02J 50/12* (2016.02)
(58) Field of Classification Search
CPC ...................................................... H02J 50/12
USPC ........................................................ 307/104
See application file for complete search history.

(56) References Cited

U.S. PATENT DOCUMENTS

2018/0102675 A1 *  4/2018  Wheeland ............... H02M 7/06
2019/0379239 A1 * 12/2019  Rozgic ................. A61N 1/3787
2019/0386518 A1 * 12/2019  de Rooij ........... H02M 3/33592
2022/0360117 A1   11/2022  Stingu et al.

FOREIGN PATENT DOCUMENTS

EP             2985846 A1     2/2016

* cited by examiner

*Primary Examiner* — Joseph Chang
(74) *Attorney, Agent, or Firm* — BLANK ROME LLP

(57) ABSTRACT

The invention relates to an input circuit (9) for a wireless power receiver (10), the input circuit (9) comprises:
an active rectifier (5) configured with output nodes;
a voltage regulator (7) connected to the output nodes, wherein the active rectifier (5) is configurated to output a DC voltage ($V_{DC}$) at the output nodes, wherein the voltage regulator (7) is arranged to actively affect the said DC voltage ($V_{DC}$);
a control structure adapted to control the DC voltage ($V_{DC}$), wherein the control structure comprises a first control loop operatively coupled to the voltage regulator (7) and configured to control a voltage regulation operation of the voltage regulator (7), and a second control loop operatively coupled to the active rectifier (5) and configured to control a rectifier operation of the active rectifier (5), operates with a faster response time (more than two order of magnitude faster) than the second control loop, and wherein the first control loop is operably engaged with the second control loop.
The invention also relates to a wireless power receiver (10) and a method for operating the wireless power receiver (10).

12 Claims, 6 Drawing Sheets

PRIOR ART

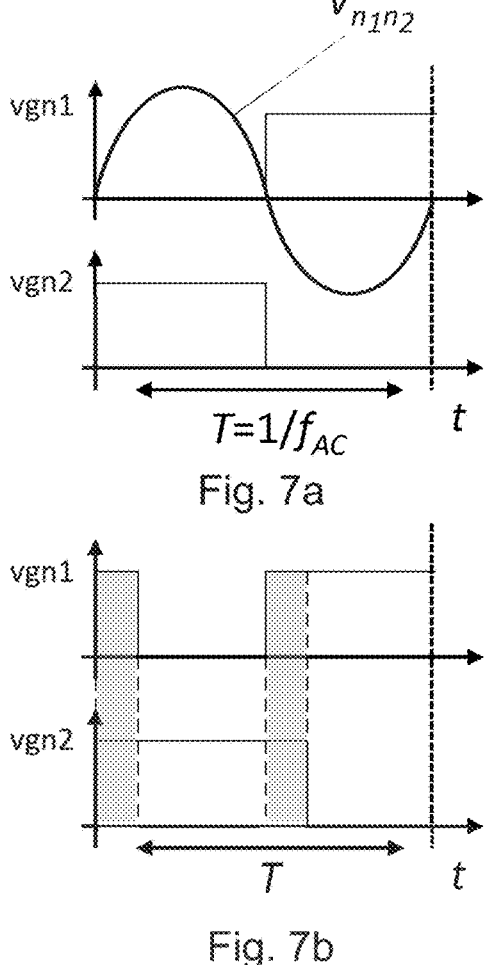
Fig. 7a
Fig. 7b
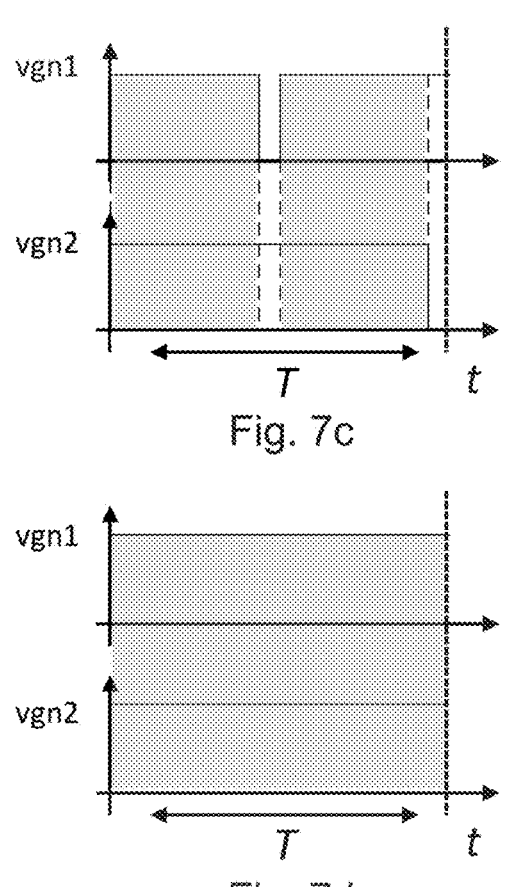
Fig. 7c
Fig. 7d

INPUT CIRCUIT FOR A WIRELESS POWER RECEIVER, WIRELESS POWER RECEIVER, AND METHOD FOR OPERATING THE WIRELESS POWER RECEIVER

REFERENCE DATA

The present application claims priority of European patent application EP23158629.8 filed on 24 Feb. 2023, the contents whereof are hereby incorporated in their entirety.

TECHNICAL DOMAIN

The present invention concerns an input circuit for a wireless power receiver, a wireless power receiver, and a method for operating the wireless power receiver.

RELATED ART

Wireless power transfer systems have been gaining much attention in recent years as it is a convenient technology to transfer energy to electrical or electronic devices without the use of cords and connectors. Wireless power transfer systems currently available and under development can be classified into inductive coupling and resonance inductive coupling systems. A wireless power transmitter and a wireless power receiver are required for both classes. The wireless power transmitter is often stationary, whereas the wireless power receiver can be portable or mobile. Wireless power transfer systems can be used to power or charge consumer electronic devices, such as mobile phones, portable music players, tablet computers, etc., but also to provide electrical energy to other devices, such as medical devices, electric cars, and rail vehicles. As one can notice, the technology can be used in various applications.

Standards were developed recently to unify wireless power transfer systems, such as the prominent Qi or Powermat standards. The said standards conventionally are used for wireless power transfer systems of consumer products, such as mobile phones. The two standards are incompatible, and a Powermat wireless power receiver can't receive power from a wireless power transmitter according to the Qi standard.

Wireless power receivers and wireless power transmitters are often only compatible when both are designed to be interoperable. Therefore, the wireless power receiver can be incompatible with the wireless power transmitter of a different wireless power transfer system, even when the wireless power transmitter is designed for the same power range, operating frequency, etc.

When a wireless power receiver is combined with an incompatible wireless power transmitter, the wireless power receiver can be damaged because the induced voltage by the incompatible wireless power transmitter may lead to higher voltages or an increased power transfer.

Solutions known from the prior art to reduce the risk of damages caused by the induction of higher voltages (higher than designed for) in the wireless power receiver are complex, often lead to additional losses in the wireless power receiver, and may come with costs for additional components, which is in particular not desirable when the wireless power receivers are destined for being produced in high volumes.

SHORT DISCLOSURE OF THE INVENTION

An object of the present invention is the provision of an input circuit for a wireless power receiver, a wireless power receiver, and a method for operating the wireless power receiver that overcomes the shortcomings and limitations of the state of the art.

According to a first aspect of the present invention, an input circuit for a wireless power receiver is disclosed, involving the features recited in claim 1. Further features and embodiments of the input circuit of the present invention are described in the dependent claims.

The invention relates to the input circuit for a wireless power receiver; the input circuit comprises:

an active rectifier configured with output nodes;

a voltage regulator connected to the output nodes, wherein the active rectifier is configured to output a DC voltage at the output nodes, wherein the voltage regulator is arranged to actively affect the said DC voltage;

a control structure adapted to control the DC voltage, wherein the control structure comprises a first control loop operatively coupled to the voltage regulator and configured to control a voltage regulation operation of the voltage regulator, and a second control loop operatively coupled to the active rectifier and configured to control a rectifier operation of the active rectifier, wherein the first control loop is adapted with a response time much faster than the second control loop (preferably more than two order of magnitude faster).

Active rectifiers or active rectifier circuits are advantageous over conventional full-wave rectifiers employing diodes as semiconductors in many aspects. Active rectifiers use controllable semiconductors that can be activated and deactivated (conducting or non-conducting). The DC voltage outputted by the active rectifier can be controlled by specifically activating or deactivating the semiconductors and letting only portions of the alternating current from the input nodes pass to the output nodes. The alternating current can be supplied to the input nodes of the active rectifier by the matching network of the wireless power receiver, particularly when the receiver coil is energized. A matching network sometimes is also referred to as an impedance-matching network.

The active rectifier converts the alternating current into a DC voltage that can be controlled by controlling the conduction angle of the controllable semiconductors and thereby controlling the timing when the controllable semiconductors are activated or deactivated, respectively. A load can be directly connected to the output nodes of the active rectifier and thus can be directly supplied with the DC voltage outputted by the active rectifier. The load can be any device compatible with the DC voltage outputted by the active rectifier. However, the matching network, the receiver coil, and the load are preferably not part of the input circuit. A capacitor for smoothing the DC voltage can also be connected to the output nodes of the active rectifier.

The voltage regulator can be connected to the output nodes of the active rectifier and can thus form a circuit parallel to the load. In particular, the voltage regulator can be connected directly to said output nodes of the active rectifier without any intermediate circuitry or other components between the voltage regulator and the active rectifier. The voltage regulator can be configured to actively affect the DC voltage supplied by the active rectifier, meaning that the voltage regulator can actively increase or decrease the DC voltage provided by the active rectifier when operated. The voltage regulator can thus be configured to increase or decrease the DC voltage by its operation. Decreasing the voltage can prevent damage to the active rectifier due to an overvoltage, whereas increasing the voltage can counteract the damage due to an overcurrent.

The control structure can comprise the first and the second control loops, wherein the first control loop can be engaged with the voltage regulator to control its operation, and the second control loop can be engaged with the active rectifier to control its operation. The first control loop might be adaptive with respect to the second control loop. The first control loop and the related voltage regulator might only be enabled (or become active) when the DC voltage supplied by the active rectifier exceeds a predetermined threshold, and the active rectifier is at risk of being damaged due to an overvoltage.

However, the criterion for activating the control loop might not be limited to the DC voltage. Further criteria, such as an overcurrent, a higher frequency ripple apparent in the DC voltage than usual, etc. can be considered alternatively or in addition as criteria for activating the first control loop and the voltage regulator, respectively. Most preferably, the first and second control loop operate in concert, and both are continuously enabled (or activated) to control the DC voltage in harmony. For instance, the first control loop can activate the voltage regulator to continuously slightly lower the DC voltage to provide a DC voltage control margin in case of spontaneous higher power demand by a load. The first control loop can immediately force the voltage regulator to stop lowering the DC voltage and thereby increasing the DC voltage.

In any case, the first control loop can be configured to control the operation of the voltage regulator much faster than the second control loop controls the operation of the active rectifier. Suppose the active rectifier outputs a voltage higher than a predetermined threshold, the voltage regulator as a part of the first control loop, can be immediately activated to affect the DC voltage (e.g. lowering the DC voltage) to protect the active rectifier and the load from the said overvoltage. Furthermore, the second control loop can successfully adapt the conduction angle of the controllable semiconductors to gradually lower the outputted DC voltage until the DC voltage is lower than the predetermined threshold. Reducing the DC voltage with the second control loop as compared to the first control loop avoids the dissipation of the power in the voltage regulator.

In summary, with the ability to affect the DC voltage and in combination with the high reactivity of the first control loop, the voltage regulator can advantageously protect the active rectifier and further components that may be comprised in the input circuit. The input circuit can furthermore contribute to the interoperability of the wireless power receiver, as the active rectifier (and other components comprised in the input circuit) can be protected in the start-up phase of the wireless power transfer system by activating the voltage regulator, suppose a higher voltage than under steady-state conditions is induced in the receiver coil. The active rectifier can successively adapt its operation by adjusting the conduction angle such that the desired DC voltage is outputted to the load. That can be useful for wireless power transmitter that induces a higher voltage into the receiver coil of the wireless power receiver. On the other hand, the active rectifier can also allow an increased flow of electrical energy into the input circuit by adjusting the conduction angle correspondingly. The high reactivity of the first control loop can be synonymous with the circumstance that the first control loop exhibits a smaller time constant and/or holds a lower response time than is the case for the second control loop. The first control loop, therefore, can react much faster to any change of the DC voltage, e.g. caused by a load transient.

The control structure can form a cascade control structure in which the first control loop controlling the voltage regulator forms the innermost control loop, and the second control loop controlling the active rectifier forms the outer control loop of the cascade control structure. As in a cascade control structure, the two control loops mentioned interact with each other because the controller output value of one controller (first control loop, voltage regulator) serves as the reference variable for another (second control loop, active rectifier); thus the two control loops are operably engaged. Furthermore, the first and the control loops are part of the same control structure and can form a common control structure.

To add some information, the first control loop could be one hundred times (two orders of magnitude) faster than the second control loop or, otherwise said, the bandwidth of the first control loop may be one hundred times broader than the bandwidth of the second control loop.

Input circuits are sometimes called output circuits, as they can output electrical energy to a load. The terms input circuit and output circuit might be used interchangeably in the course of the present disclosure.

In a first embodiment of the first aspect of the invention, the second control loop of the input circuit can comprise an integrator operatively coupled to the active rectifier and configured to adapt the rectifier operation of the active rectifier in response to a variation of the DC voltage. The integrator can control a delay element comprised in the second control loop that prevents the active rectifier from quickly adjusting the rectifier operation in case of variations in the DC voltage. The variations can be voltage fluctuations caused by the operation of the controllable semiconductors or can be caused by variations of an alternating current inputted into the active rectifier.

In a second embodiment of the first aspect of the invention, the adaptation of the rectifier operation of the input circuit can comprise the adaptation of a conduction angle of the active rectifier for controlling the DC voltage, wherein the control structure can be configured to exclusively control the DC voltage by adapting the conduction angle if the DC voltage is away from a predetermined threshold. As mentioned before, the second control loop can be configured to control or adjust the conduction angle of the controllable semiconductors to vary and control the DC voltage outputted by the active rectifier. The term exclusively can refer to the circumstance that the second control loop controls the DC voltage by adjusting the conduction angle if the DC voltage is below a predetermined threshold and the first control loop, including the voltage regulator, can be deactivated. The predetermined threshold can correspond to the voltage that is required by the load. In fact, an increase of the conduction angle of the controllable semiconductors above 50% (where the maximum efficiency of the active rectifier happens) results in a partial short circuit at the input of the active rectifier, which results in lower power to be delivered to the voltage regulator and finally to the load. The overlap between the conduction angles can be increased to completely shunt the inputs of the active rectifier if needed.

In a third embodiment of the first aspect of the invention, the active rectifier of the input circuit can be configured with input nodes for connecting the active rectifier to a receiver matching network, wherein the receiver matching network can be external to the input circuit.

In a further embodiment of the first aspect of the invention, the second control loop of the input circuit can be configured to adapt the conduction angle of the active rectifier to control an input impedance of the input circuit connected to the receiver matching network via the input nodes. The flow of electrical energy into the input circuit can be controlled by varying the input impedance.

In another embodiment of the first aspect of the invention, the second control loop can be configured to adapt the conduction angle of the active rectifier to control an input impedance of the input circuit to zero for short-circuiting the input nodes. Short-circuiting the input nodes can prevent the active rectifier from outputting the DC voltage. Short-circuiting the input nodes also leads to a very low (nearly zero) impedance at the input of the input circuit and of the active rectifier, respectively. In this case, the input impedance is mainly characterized by the voltage drop across the controllable semiconductors. A wireless power transmitter may notice that the impedance in the wireless power receiver is lower than usual and can adapt or terminate the wireless power transfer accordingly. Short-circuiting in the course of the present disclosure can mean partly or completely short-circuiting the input nodes, whereas partly can refer to the fact that only portions of the receiver coil induced AC voltage can pass to the output nodes of the active rectifier.

In a different embodiment of the first aspect of the invention, the voltage regulator of the input circuit can be adapted to actively reduce the DC voltage if the DC voltage exceeds a predetermined threshold. Lowering the DC voltage can prevent damage to the active rectifier and/or the load. Lowering the voltage can lead to a low impedance at the output nodes of the active rectifier, which in turn may cause a low voltage drop across the controllable semiconductors of the active rectifier.

In another embodiment of the first aspect of the invention, the voltage regulator of the input circuit can be provided as a shunt regulator and can be configured to shunt a DC current for reducing the DC voltage, wherein the first control loop can be adapted to control the DC current during the voltage regulation operation, if the DC voltage exceeds a predetermined threshold. The shunt regulator can be configured to maintain the voltage constant across its terminals by shunting a current to the ground. In a real implementation, the DC current mentioned before might not be an ideal DC current, as it may contain a ripple.

The amperage of the current can be controlled by the first control loop. If the DC voltage outputted by the active rectifier exceeds the predetermined threshold, the first control loop and the shunt regulator can be activated to actively lower the voltage by keeping the voltage across the terminals of the shunt regulator constant. The shunt regulator can act as a sink in the input circuit if the DC voltage is higher than the said threshold.

In a further embodiment of the first aspect of the invention, the active rectifier of the input circuit can comprise a plurality of controllable semiconductor switches, wherein each controllable semiconductor switch can be provided as a MOS active diode. The abbreviation "MOS" typically refers to metal-oxide-semiconductors. Active diodes implemented in MOS technology can minimize reverse leakage and achieve a low forward voltage. In summary, active diodes implemented in MOS technology can be advantageous over conventional diode-connected MOS transistors, which typically have a forward voltage of around 300 mV.

In a different embodiment of the first aspect of the invention, the active rectifier of the input circuit can be adapted to withstand a voltage of less than 15V, more preferably less than 10V, and most preferably less than 5V. Alternatively or in addition, the active rectifier can be configured to supply less than 10 W, more preferably less than 5 W, most preferably less than 1 W of power at the output nodes. Thus, the input circuit can be configured for low voltage, low power applications and thus can be specifically designed for the application in consumer products, such as mobile phones, wearables, etc. In particular, the input circuit can be partly or completely implemented in low-voltage CMOS (complementary metal-oxide-semiconductor) technology.

The mixture of different semiconductor technologies, such as those used for the BiCMOS or bipolar-CMOS-DMOS can be omitted to simplify the production process. In addition and thanks to the fact that the voltage regulation using the voltage regulator/shunt regulator, controlled by the first control loop and the active rectifier, controlled by the second control loop are combined (as opposed to separate procedures of rectification and regulation by DCDC), the output circuit can be configured for low power application using low-voltage CMOS.

Even though the individual embodiments of the first aspect cover different aspects of the invention, some or all embodiments can be combined when it is useful and feasible from a technical standpoint.

According to a second aspect of the present invention, a wireless power receiver for a wireless power transfer system is disclosed.

The invention further relates to the wireless power receiver comprising:

a load;

a receiver coil configured to receive electrical energy via inductive coupling from a transmitter device external to the wireless power receiver;

a receiver matching network comprising a plurality of capacitors and configured to match an impedance of the receiver coil;

the input circuit of the first aspect, including the embodiments or a combination of embodiments of the first aspect, connected with the input nodes to the receiver matching network and configured to supply the load with the DC voltage, wherein the input circuit is configured to reduce the DC voltage if an electrical power supplied by the receiver matching network to the input circuit exceeds a power demand by the load.

The active rectifier can be connected with its input nodes to the receiver matching network. The input nodes of the active rectifier can form the input end of the input circuit. The receiver matching network can supply a higher electrical power if a higher voltage is induced in the receiver coil and the impedance is perfectly matched. Higher electrical power can result in a higher DC voltage outputted by the active rectifier, particularly if the load can't absorb the additional electrical energy. In this case, the input circuit can be configured to reduce the DC voltage, initially by activating the voltage or shunt regulator. The DC voltage, however, can be controlled with the use of the control structure of the input circuit. Alternatively, the active rectifier can be controlled to short-circuit the input nodes partially or completely with the help of the control structure.

Reducing the DC voltage can protect the input circuit and the active rectifier from overvoltage. A voltage reduction can also lead to a mismatch of the impedance of the receiver matching network and the impedance of the receiver coil, whereby the additional electrical power provided by the receiver matching network can be dissipated in the said matching network and/or in the receiver coil, respectively. This is advantageous over the prior art, where the excess electrical power needs to be dissipated in other components of the input circuit, such as a DCDC regulator. The voltage reduction of the voltage or shunt regulator results in lower impedance at the input of the input circuit. The impedance can also be lowered, as mentioned before, by adapting the conduction angle of the active rectifier, in particular by overlapping the conduction angles. However, the process of controlling the conduction angle with the use of the second control loop can be performed much slower compared to the voltage regulation of the voltage regulator or shunt regulator with the use of the first control loop.

In a first embodiment of the second aspect of the invention, the input circuit of the wireless power receiver can be adapted to activate the voltage regulator for reducing the DC voltage if the power supplied by the receiver matching network to the input circuit exceeds the power demand by the load. The losses of the active rectifier can be taken into account and might be added to the power demanded by the load. The voltage regulator can be configured as a shunt regulator, whereby the voltage regulator or shunt regulator can be activated and controlled with the use of the control structure, particularly by the first control loop.

In a second embodiment of the second aspect of the invention, the input circuit of the wireless power receiver can be configured to detune a resonant circuit formed by the receiver matching network and the inductance of the receiver coil for reducing the power supplied by the receiver matching network. This can be achieved by activating the voltage or shunt regulator, or by short-circuiting the input nodes of the active rectifier.

This might furthermore be achieved by increasing the conduction angle of the controllable semiconductors. The resonant circuit can be detuned if the electrical power supplied by the matching network to the input circuit exceeds the power demand by the load employing the measures mentioned before. The resonant circuit can preferably be configured as a parallel-resonant circuit. However, also a series-resonant circuit can be detuned by activating the voltage or shunt regulator, or by short-circuiting the input nodes of the active rectifier. Detuning can lead to a mismatch of the impedance of the receiver matching network and the impedance of the receiver coil. The power transfer between the wireless power transmitter and receiver is less efficient and can thus result in less power being delivered to the input circuit. The control structure controls the operation accordingly.

In a third embodiment of the second aspect of the invention, the input circuit of the wireless power receiver can be configured to activate the voltage regulator for detuning the resonant circuit. In the present embodiment, the voltage regulator can be configured as a shunt regulator. The resonant circuit can be detuned if the electrical power supplied by the matching network to the input circuit exceeds the power demand by the load employing the measures and control as mentioned before.

In a further embodiment of the second aspect of the invention, the input circuit of the wireless power receiver can be configured to short-circuit the input nodes of the active rectifier for detuning the resonant circuit. The operation of the active rectifier is controlled with the control structure, in particular by the second control loop. The resonant circuit can be detuned if the electrical power supplied by the matching network to the input circuit exceeds the power demand by the load.

Even though the individual embodiments of the second aspect cover different aspects of the invention, some or all embodiments can be combined when it is useful and feasible from a technical standpoint.

According to a third aspect of the present invention, a method for operating the wireless power receiver of the second aspect of the invention, including the embodiments or a combination of embodiments of the second aspect, is disclosed.

The invention also relates to the method comprising the steps of:

receiving electrical energy via inductive coupling from a transmitter device external to the wireless power receiver for generating an alternating current;

converting the alternating current into the DC voltage using the active rectifier;

supplying the load with the DC voltage;

reducing the DC voltage using the voltage regulator if the power supplied to the load is higher than the demanded power thereof;

preferably detuning the resonant circuit by activating the voltage regulator or by reducing the input impedance, by short-circuiting the input terminals of the active rectifier.

Alternatively, the method can exclusively comprise the step of detuning the resonant circuit by activating the voltage regulator or short-circuiting the active rectifier's input terminals. The voltage regulator can be configured as a shunt regulator, and the active rectifier and the control structure can be configured as disclosed in one embodiment or in the combination of multiple embodiments of the first aspect of the invention.

Reducing the voltage can protect the input circuit and the active rectifier from an overvoltage. Detuning the resonant circuit with the voltage regulator (or shunt regulator) or by short-circuiting the input nodes of the active rectifier can lead to the protection of the input circuit, as the unwanted power can be dissipated in the resonant circuit and the receiver coil respectively instead of being dissipated inside the voltage regulator or the shunt regulator. Additional power losses conferred by the power conversion of the input circuit are omitted.

SHORT DESCRIPTION OF THE DRAWINGS

Exemplar embodiments of the invention are disclosed in the description and illustrated by the drawings in which.

Figure 3:
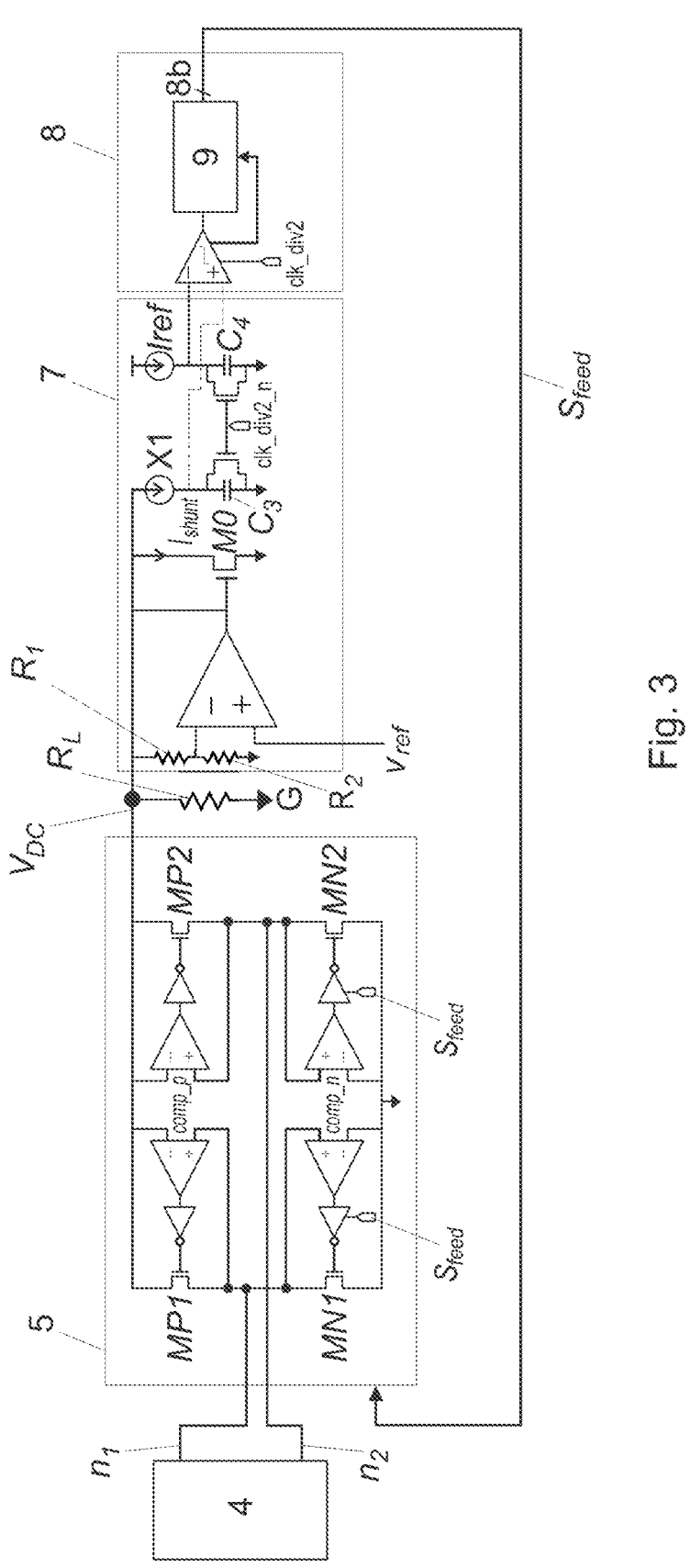
FIG. 3 illustrates the wireless power receiver of FIG. 2 in greater detail.
Figure 5:
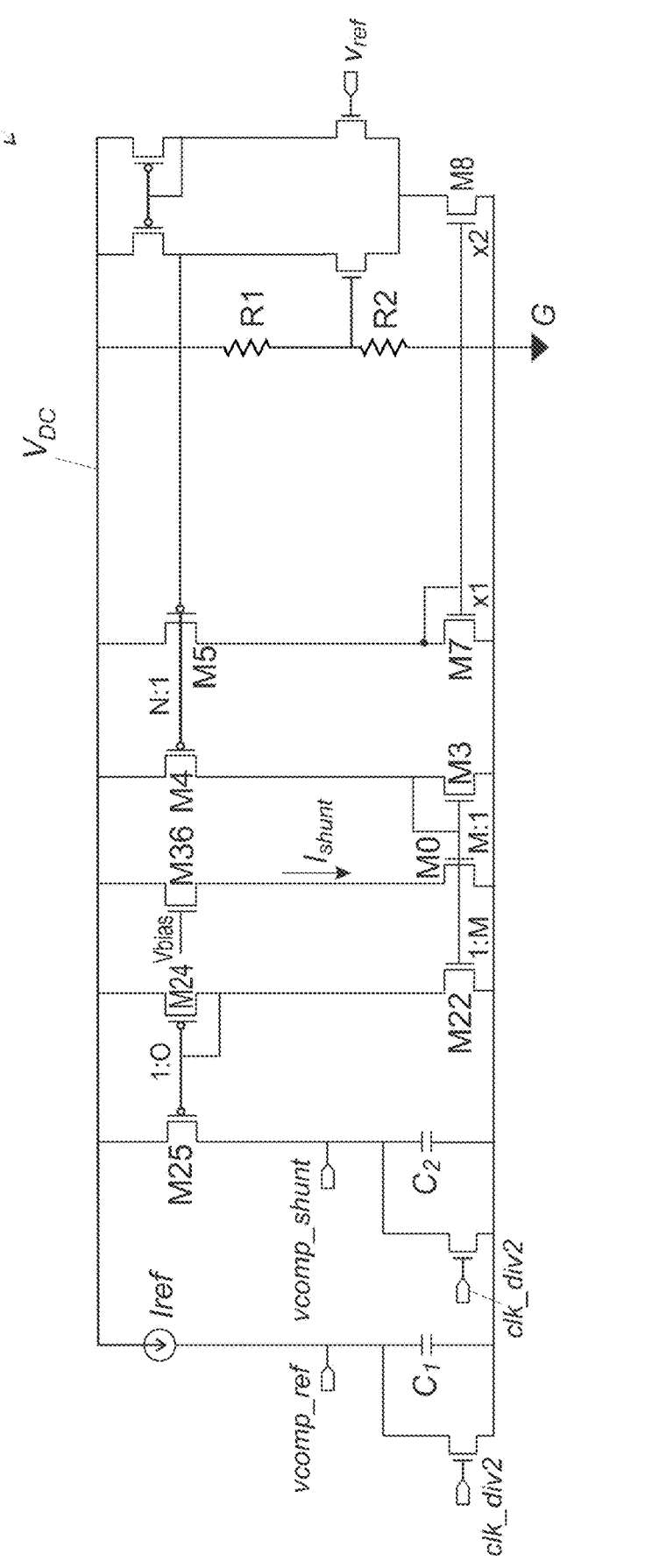

FIG. 5 comprehensively illustrates the shunt regulator of FIG. 3.

Figure 6:
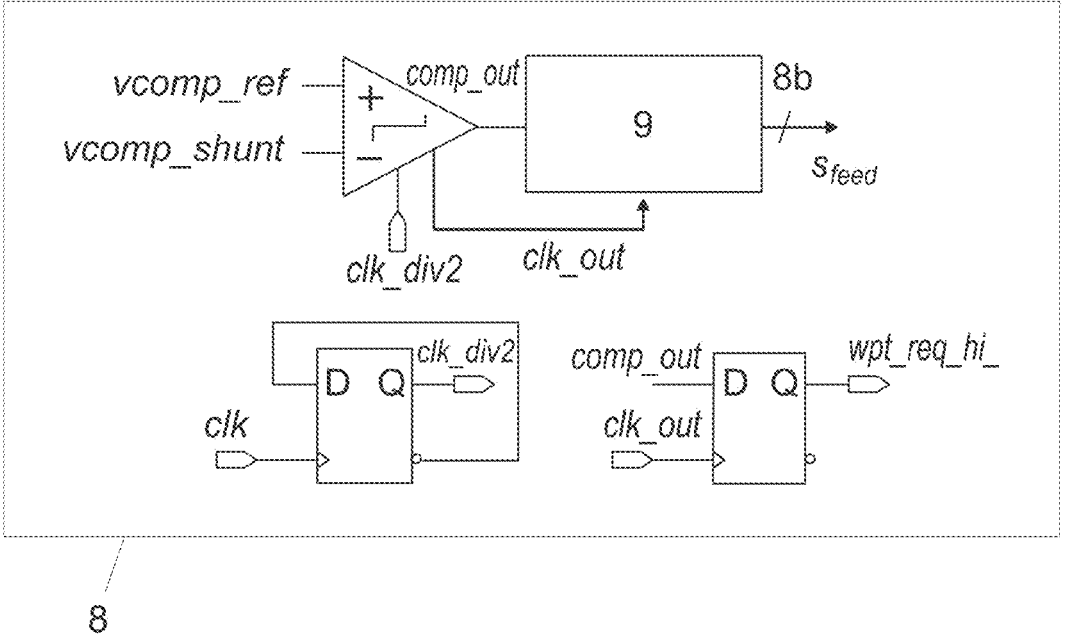

FIG. 6 illustrates the integrator circuit of FIG. 3 in more detail.

FIGS. 7a to 7d illustrate the gate signals of the low-side active diodes in dependency on the conduction angle.

EXAMPLES OF EMBODIMENTS OF THE PRESENT INVENTION

Figure 1:
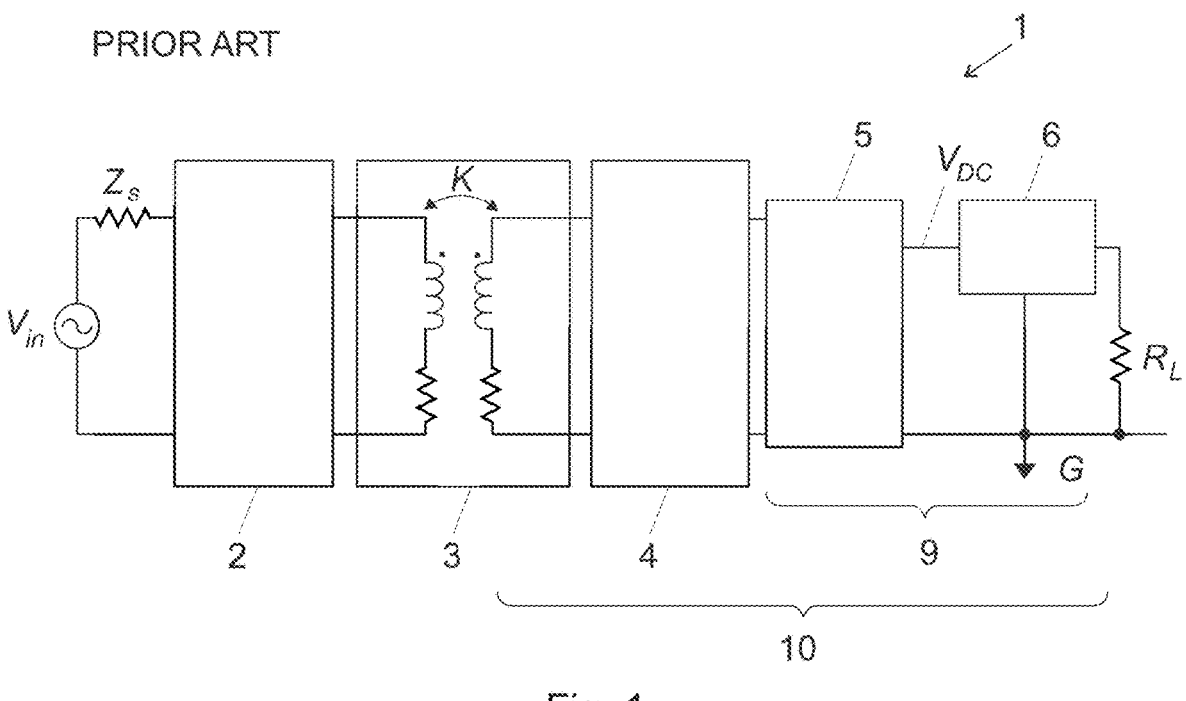
FIG. 1 illustrates a magnetic induction power transfer system schematically according to the state of the art.

FIG. 1 illustrates a typical magnetic induction power transfer system 1 according to the state of the art. The wireless power transmitter comprises the controllable voltage source $V_{in}$, the transmitter matching network 2, and the transformer 3, which consists of the transmitter coil and the receiver coil magnetically coupled by the coupling coefficient K.

The wireless power receiver 10 comprises the receiver coil, the receiver matching network 4, the rectifier 5, the DCDC regulator 6, and the load $R_L$. The rectifier 5 and the DCDC regulator 6 are functioning as input circuit 9.

The controllable voltage source $V_{in}$ of the wireless power transmitter supplies an AC voltage to the transmitter matching network 2. The matching network 2, in combination with the transmitter coil forms a resonant circuit that can be tuned to the frequency of the AC voltage supplied by the voltage source $V_{in}$ and/or to transfer the maximum electrical energy to a wireless power receiver. The frequency of the AC voltage typically accounts for some tenth kilohertz, up to a few megahertz. The coupling coefficient K of transformer 3 is relatively small compared to a conventional transformer with a transformer core, as the transmitter and receiver coils are loosely coupled.

When the transmitter coil is energized, an AC voltage is induced into the receiver coil due to electromagnetic induction. The impedance of the receiver coil (including the stray inductance of the transformer 3) is matched by the receiver matching network 4. The receiver coil and the receiver matching network 4 form a further resonant circuit. The induced AC voltage is converted with the rectifier 5 into a non-regulated DC voltage, and the said DC voltage is further regulated with the DCDC regulator 6 into a regulated DC voltage $V_{DC}$ compatible with the load $R_L$. The rectifier 5 is configured as a conventional full-wave rectifier, whereby the DCDC regulator is provided in a buck-boost topology. Thus the regulated DC voltage $V_{DC}$ can be higher or lower than or equal to the non-regulated DC voltage.

The input impedance $Z_s$ is seen by the voltage source $V_{in}$, for instance, when electrical energy is transferred to the load $R_L$. In case all impedances are perfectly matched and power is transferred to the load $R_L$, the imaginary part of the input impedance $Z_s$ is close to zero, and the real part prevails. This is the case scenario where the wireless power transfer system operates efficiently.

By (for instance) misaligning the receiver coil with respect to the transmitter coil, the imaginary part of the input impedance $Z_s$ increases, as the impedance caused by the increase of the stray inductance is not perfectly matched by the receiver matching network 4. In reverse, more reactive power is circulating in the wireless power transfer system, thereby reducing its efficiency. Therefore, the input impedance $Z_s$ represents a lumped element of the impedance of the transmitter side and receiver matching network in combination with the load impedance. The load impedance can account for the sum of the rectifier's impedance, the DCDC regulators' impedance, and the impedance of the load $R_L$.

Suppose the wireless power receiver 10 is operated in combination with an incompatible wireless power transmitter of the same power range, a higher voltage (higher than designed for) can be induced into the receiver coil. The higher unregulated DC voltage needs to be regulated by the DCDC regulator 6 into the regulated DC voltage $V_{DC}$ compatible with the load $R_L$. This leads to higher power dissipation in the DCDC regulator and, therefore, higher losses in the wireless power receiver 10, which is not desirable and impractical, especially for low voltage applications. In worst-case scenarios, the wireless power receiver 10 can be damaged when operating with an incompatible wireless power transmitter.

Figure 2:
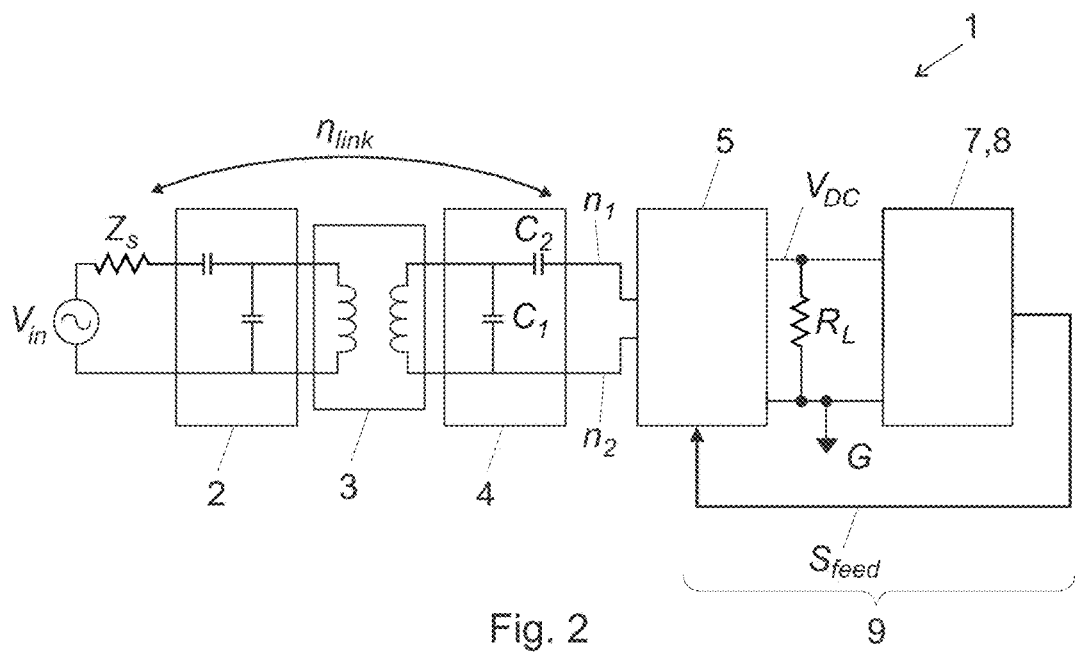
FIG. 2 shows an example of a magnetic induction power transfer system according to the invention schematically.

A solution for this problem is illustrated in FIG. 2, as an example of an inductive power transfer system 1 according to the invention.

The wireless power transmitter comprises the controllable voltage source $V_{in}$, the transmitter matching network 2, and the transformer 3, which consists of the transmitter and receiver coil magnetically coupled with each other. The wireless power transmitter comprises the transmitter matching network 2 connected to the controllable voltage source $V_{in}$.

The wireless power receiver comprises the receiver coil, the receiver matching network 4, the active rectifier 5, the shunt regulator 7, and the integrator circuit 8. The active rectifier 5, the shunt regulator 7, and the integrator circuit 8 are functioning as the input circuit. The load $R_L$ exemplary is directly connected to the output terminals of the active rectifier.

The wireless power receiver also comprises a parallel-resonant circuit, formed by the parallel connection of the receiver coil inductance and the first capacitor $C_1$ of the receiver matching network 4. The receiver matching network 4 further comprises the second capacitor $C_2$, which is used to tap the energy resonating in the parallel-resonant circuit when the receiver coil is energized by electromagnetic induction.

The active rectifier 5 is connected at its input terminals $n_1$, $n_2$ to the receiver matching network 4. The active rectifier 5 comprises controllable semiconductors, which stands in contrast to the full-wave rectifier of FIG. 1. The controllable semiconductors used are MOS active diodes, which have the advantage of a low forward voltage when compared to other conventional diodes or diode-connected MOS transistor.

The structure of the active rectifier 5 will be discussed in greater detail in FIG. 4. The conduction angle of the controllable semiconductors is set according to the feedback signal $S_{feed}$. The active rectifier 5 acts as a first control instance, utilizing the active rectification of the active rectifier 5. The AC voltage (or AC current) supplied by the receiver coil and the corresponding matching network 4 at the input terminals $n_1$, $n_2$, can directly be converted into a controlled DC voltage $V_{DC}$ at the output terminals of the active rectifier 5.

The level of the controlled DC voltage $V_{DC}$ can be influenced by varying the corresponding feedback signal $S_{feed}$. The controlled DC voltage $V_{DC}$ is used to power the load $R_L$. If the input power supplied by the matching network 4 at the input terminals $n_1$, $n_2$ of the active rectifier 5 is higher than the required power by the load $R_L$, the shunt regulator 7 starts to dissipate the additional energy apparent in the input circuit, by shunting a current to ground G.

The controlled DC voltage $V_{DC}$ is lowered accordingly, thereby protecting the input circuit and the load $R_L$ from overvoltage. At the same time, when the shunt regulator 7 shunts the current to the ground G, the feedback signal $S_{feed}$, which is outputted by the integrator circuit 8, is varied to influence the conduction angle of the controllable semiconductors. The conduction angle is adjusted such that the controlled DC voltage $V_{DC}$ outputted by the active rectifier 5 is lowered. The conduction angle is further varied by the integrator circuit 8 until the input power matches the demand of the load $R_L$. As long as the input power is higher than the demand, the shunt regulator 7 operates in parallel to the adaptation of the conduction angle. Once the input power is lower than or matches the demand of the load $R_L$, the shunt regulator 7 stops shunting the current to the ground G, and the conduction angle exclusively is controlled to compensate for any variation of the demand of the load $R_L$.

However, the shunt regulator 7 can still be controlled to shunt a small amount of current to ground, and thereby slightly lowering the controlled DC voltage $V_{DC}$. The operation of the shunt regulator 7 might be terminated if a higher power demanded by the load $R_L$ is required. The controlled DC voltage $V_{DC}$ might slightly increase, as there is no current shunted to the ground anymore. Fluctuations of the load $R_L$ can be efficiently compensated, and the conduction angle of the active rectifier 5 can be slowly re-adjusted.

It can be noticed that two control loops are employed to control the controlled DC voltage $V_{DC}$. The first control loop is provided by the shunt regulator 7, which reacts very quickly to changes in the input power but also to any load changes. The further control loop is provided for adapting the conduction angle of the active rectifier 5, which reacts slowly and compensates small variation in the input power in accordance with the power demand by the load $R_L$.

The use of the shunt regulator 7 has multiple advantages. The shunt regulator 7 can, at least for a short amount of time, dissipate more power than the active rectifier 5 can handle. The active rectifier 5 can be designed with controllable semiconductors with a lower voltage rating, as it is ensured by the shunt regulator 7 that the voltage drop over the controllable semiconductors is limited. On the other hand, the controllable semiconductors can be selected to be optimized for current conducting instead of being resistant to high voltages, which can significantly improve the efficiency of the active rectification.

The conduction angle of the controllable semiconductors and the operation of the shunt regulator 7 can be controlled independently, which can lead to power and voltage regulation with high precision. The shunt regulator 7 and the active rectifier 5 provide in the configuration of the matching network 4 as illustrated a further advantage, which will be discussed in more detail in the following.

Suppose the current is shunted by the shunt regulator 7 and/or the conduction angle of the controllable semiconductors is selected such that input terminals $n_1$, $n_2$ are partially or completely short-circuited. This will change the impedance that the input circuit 9 presents to the matching network 4 and may detune the parallel-resonant circuit (as the reactance of the second capacitor $C_2$ predominates). In turn, the efficiency $\eta_{link}$ of the wireless power transfer is reduced, and the power is dissipated in the parallel-resonant circuit and in the receiver coil, respectively. Therefore, there will be less power available for the input circuit and thus, eventually no need for the shunt regulator 7 to shunt any current. Even though this advantage is discussed in the light of a parallel-resonance circuit, the same effect can become apparent in connection with a series-resonance circuit.

FIG. 3 illustrates the wireless power receiver of FIG. 2 in greater detail. The matching network 4 is configurated as shown in FIG. 2, and the matching network 4 is connected to the input terminals $n_1$, $n_2$ of the active rectifier 5. The active rectifier 5 comprises the controllable semiconductors in the configuration of MOS active diodes. As said, the MOS active diodes are selected as they employ a low forward bias voltage.

Each controllable semiconductor MP1, . . . , MN2 is controlled by the related comparator comp_p, comp_n between a conductive and non-conductive state. The shunt regulator 7 is connected to the output terminals of the active rectifier 5, and a load $R_L$ is connected therebetween (note the lower rail in the active rectifier 5 is connected to ground G).

The integrator 8 comprises a double tail dynamic bias comparator connected with each of its input terminals between a different current source X1, Iref and a capacitor $C_3$, $C_4$ of the shunt regulator 7. The voltage signal the comparator receives mimics the shunt current $I_{shunt}$, that can be conducted by the transistor M0 in the shunt regulator 7. The integrator 8 further comprises an 8-bit up/down counter 9, which receives the signal from the comparator as input, and outputs the feedback signal $S_{feed}$ in the form of an 8-bit code to the active rectifier 5. The conduction angle of the controllable semiconductors depends on the feedback signal $S_{feed}$ outputted by the up/down counter 9 of the integrator 8.

Figure 4:
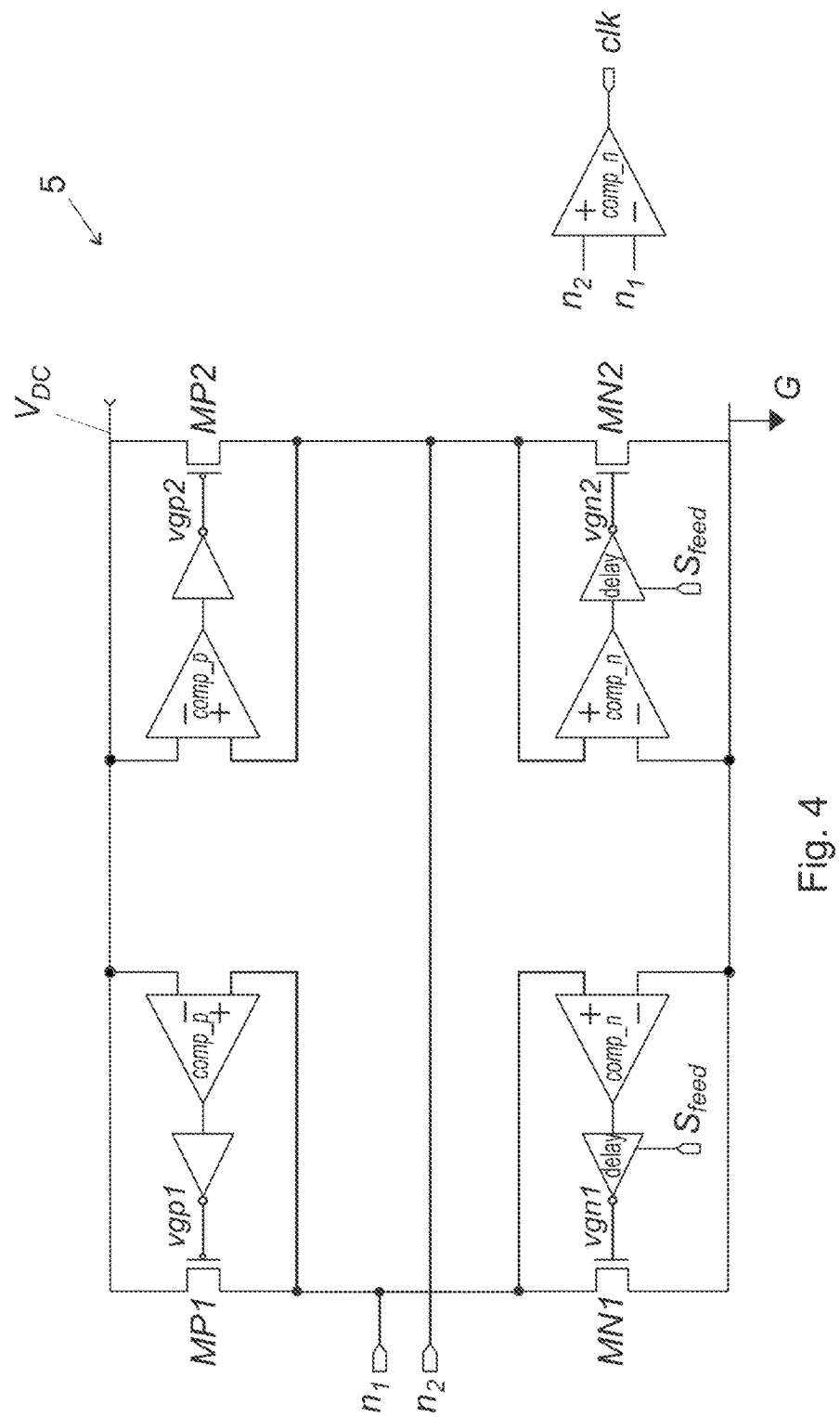
FIG. 4 shows the active rectifier of FIG. 3 exhaustively.

FIG. 4 shows the active rectifier 5 of FIG. 3 in more detail. The active rectifier 5 uses two types of comparators to control its controllable semiconductors MP1, . . . , MN2. The conduction angle of the rectifier up-side active diodes MP1, MP2 are controlled by the supply compatible comparators comp_p, and it prevents any reverse current in the active rectifier 7 even if the matching network and the receiver coil does not provide sufficient power or voltage at input terminals $n_1$, $n_2$.

The conduction angle of the rectifier low-side active diodes MN1, MN2 are controlled by the ground compatible comparators comp_n followed by the feedback signal $S_{feed}$ as shown in FIG. 3. The feedback signal $S_{feed}$ is used by the delay entities, as illustrated, to delay the activation pulses generated by the ground compatible comparators comp_n in dependency of the feedback signal $S_{feed}$. It is of course possible to employ cascode MOS active diodes, in order to increase the withstand voltage.

The up-side active diodes MP1, MP2 are configured as active low, whereas the low-side active diodes MN1, MN2 are configured as active high diodes. The up-side active and the low-side active diodes thus are operating complementary to each other, whereby the conduction angle of the low-side active diodes MN1, MN2 can be adjusted by the feedback signal $S_{feed}$ accordingly.

The delay of this feedback line in FIG. 3 is adjusted with the help of the feedback signal $S_{feed}$, which originates from the integrator of FIG. 3 or FIG. 6, respectively. The feedback line should be provided no delay at the minimum code of the feedback signal $S_{feed}$ and at a complete half-cycle delay at its maximum code of the feedback signal $S_{feed}$ to be able completely short-circuit the input terminals $n_1$, $n_2$.

The main clock clk of the input circuit is generated by the ground compatible comparators comp_n from the AC signal apparent during power transfer between the input terminals $n_1$, $n_2$.

FIGS. 7a to 7d illustrates the gate signals vgn1, vgn2 of the low-side active diodes MN1, MN2 in dependency of the conduction angle. In the top diagram of FIG. 7a, the gate signal vgn1 of the first active diode MN1 is illustrated, whereas the bottom diagram illustrates the gate signal vgn2 of the second active diode MN2. The fundamental component of the voltage $V_{n1n2}$ supplied by the receiver matching network also is illustrated as a sine wave. It can be noticed that in the positive half-wave of the voltage $V_{n1n2}$ the gate signal vgn1 of the first active diodes MN1 is low, and the first active diodes MN1 is not conducting, whereas the gate signal vgn2 of the second active diodes MN2 is high and the second active diodes MN2 consequently conducts a current. In the negative half-wave of the voltage $V_{n1n2}$ the situation is reversed, whereby the first active diode MN1 is conducting and the second active diode MN2 is blocked. The pulse period T corresponds to one over the frequency $f_{AC}$ of the fundamental component, and the duty cycle of the gate signals corresponds to 50% each.

In the following FIGS. 7b to 7d the same gate signals vgn1, vgn2 of the low-side active diodes MN1, MN2 are illustrated. However, for the sake of a simple illustration, the illustration of the fundamental component of the voltage $V_{n1n2}$ was omitted. It can be noticed in FIG. 7*b* that the falling edges of the gate signals vgn1, vgn2 are delayed in dependency on the feedback signal provided by the integrator. The grey highlighted areas shall indicate that both low-side active diodes MN1, MN2 are conducting at the same time and thereby short-circuiting the input terminals of the input circuit at least for the amount of time as illustrated. The grey highlighted area accounts for approximately 20% of the pulse period T. During this time, no electrical energy is converted by the active rectifier, and the controlled DC voltage is lowered accordingly. FIG. 7*c* is a continuation of FIG. 7*b* in which the conduction angle is further increased by delaying the falling edge of the gate signals vgn1, vgn2. The grey highlighted area accounts for approximately 90% of the pulse period T. In this operational scenario, the controlled DC voltage outputted by the active rectifier is further reduced. FIG. 7*d* illustrates the extreme scenario in which both low-side active diodes MN1, MN2 are conducting at the same time for the entire pulse period T, since the corresponding gate signals vgn1, vgn2 are high. The input nodes of the input circuit are completely short-circuited, and the active rectifier does not output electrical energy at all. At the same time the parallel-resonant circuit is detuned, whereby the impedance of the receiver matching network does not match the impedance of the receiver coil anymore. The electrical energy receivable by the wireless power receiver will be reduced since the receiver side matching is no longer aligned, and parts of the excess electrical energy will be dissipated in the receiver coil and the low-side active diodes MN1, MN2.

FIG. 5 comprehensively illustrates the shunt regulator 7 of FIG. 3. The shunt regulators amplifier (circuit branch on the right) compares the scaled version of the controlled DC voltage $V_{DC}$ (scale factor R2:(R1+R2)) with the reference voltage $V_{ref}$. The reference voltage $V_{ref}$ can be provided by a circuit or control instance external to the input circuit and can correspond to the scaled version of the voltage or power demanded by the load.

If the controlled DC voltage $V_{DC}$ is higher than the reference voltage ((1+R1/R2)*$V_{ref}$), the current in transistor M4 increases and thus forces the shunt current $I_{shunt}$ in the transistor M0 to increase of up to 150 mA or more. This in return, reduces the controlled DC voltage $V_{DC}$ and protects the circuit from an overvoltage. The transistor M0 will not carry any current if the controlled DC voltage $V_{DC}$ is less than the reference voltage $V_{ref}$ ((1+R1/R2)*$V_{ref}$). This fast control mechanism reacts quickly to a sudden change in the input power, apparent as a voltage between the input terminals to regulate the controlled DC voltage $V_{DC}$ and to protect the input circuit and the load from a high voltage, if the input power suddenly increases. As long as adequate input power or voltage between the input terminals, the controlled DC voltage $V_{DC}$ increases to 5*$V_{ref}$. In a case of a sudden increase of power demanded by the load, the shunt regulator 7, can provide the MO*$I_{ref}$ current at its disposal to the load in order to prevent a sudden drop of the controlled DC voltage $V_{DC}$.

The slow control mechanism, comprising the circuit branch on the left in combination with the integrator 8 of FIG. 6 regulates the input power apparent at the input terminals of the active rectifier by controlling the conduction angles of active diodes MN1, MN2 as illustrated in FIG. 4 by adapting the feedback signal $S_{feed}$.

When this conduction angle exceeds 50%, there will be an overlap in the conduction angles of active diodes MN1, MN2. That means that both low-side active diodes MN1, MN2 are closed (conducting) at the same time during this overlap. This short-circuits the input of the active rectifier, which causes a dissipation of the power in the receiver coil and the receiver matching network, respectively. Consequently, less power will enter the wireless power receiver.

The slow control mechanism can be understood as the continuation of the fast control mechanism. Due to the ripple on controlled DC voltage $V_{DC}$ and the high reactivity of the amplifier in the shunt regulator 7, the shunt current $I_{shunt}$ in transistor M0 in fact is not a DC current but a train of pulse of currents at twice the frequency of the AC voltage between the input terminals. A replica of the shunt current $I_{shunt}$ is integrated over two clock cycles onto the capacitor $C_4$ to generate the shunt current reference voltage vcomp_shunt, while the reference current Iref is integrated on the reference capacitor $C_3$ to generate the reference voltage vcomp_ref.

FIG. 6 illustrates the integrator 8 in detail. The integrator 8 comprises the comparator and the 8-bit up/down counter 9, which receives the signal from the comparator as input and outputs the feedback signal $S_{feed}$ in the form of the 8-bit code. The D flip-flop at the bottom left divides the main clock clk provided by the ground-compatible comparators of FIG. 4, whereby the comparator outputs the signal to the 8-bit up/down counter 9 every second pulse.

The shunt current reference voltage vcomp_shunt and the reference voltage vcomp_ref (originating from the shunt regulator of FIG. 5) are compared with the comparator to generate the overpower signal wpt_req_hi. The value of the overpower signal wpt_req_hi is updated every second cycle.

When the said signal becomes zero, there is more power entering to the wireless power receiver than required by the load and the 8-bit code of the feedback signal $S_{feed}$ is incremented accordingly, and thereby increasing the conduction angle of the low-side active diodes MN1, MN2. Incrementing the 8-bit delay code of the feedback signal $S_{feed}$ in turn, reduces the input power and the voltage at the input terminals. It can be noticed that the overpower signal wpt_req_hi can also be used to set the direction of counting of the 8-bit counter.

As it has been stated previously and turning back to FIG. 5, a replica of the shunt current $I_{shunt}$ is integrated over two clock cycles in capacitor $C_4$. Thanks to this integration and the slow regulation, the average current in the transistor M0 is set to $I_{shunt}$=MO*Iref in a steady state condition. This excess current is at disposal of the shunt regulator to prevent the drop of voltage in case of a sudden increase of the load. The reference current Iref can be trimmed when necessary. Consequently, the shunt current $I_{shunt}$ is controlled proportionally to the reference current Iref.

The details of the configuration of the active rectifier, the shunt regulator and the integrator can vary, depending on the required design. All design considerations need to be made in connection with the voltage and current ratings required for the wireless power receiver.

In conclusion, a two-fold control is implemented. The fast regulation is performed by the shunt regulator, and the slow regulation is performed by the integrator, varying the conduction angle of the controllable semiconductors. The wireless power receiver can further comprise a communication interface for sending control signals to the wireless power transmitter. The control signals sent from the wireless power receiver to the wireless power transmitter can be the feedback signal $S_{feed}$ and/or the overpower signal wpt_req_hi. With the use of these two control signals can the wireless power transmitter adapt the transmittable power, to prevent the activation of the shunt regulator and thereby increase the overall efficiency of the power transfer.

Furthermore, the wireless power transmitter can be designed to detect the activation of the shunt regulator in the wireless power receiver by detecting a lower power demanded by the wireless power receiver or by determining the reactive power in the wireless power transfer system, caused by the detuned wireless power receiver. In all cases, the wireless power transmitter may reduce the transmittable power by lowering the input voltage or current.

REFERENCE SYMBOLS IN THE FIGURES

1 Electromagnetic coupled wireless power transfer system
2 Transmitter matching network
3 Transformer
4 Receiver matching network
5 Rectifier, active rectifier
6 DC/DC converter
7 Voltage regulator, shunt regulator
8 Integrator circuit
9 Input circuit
10 Wireless power receiver (device)
$C_1$, $C_2$ Wireless power receiver matching network capacitors
$n_1$, $n_2$ input nodes of active rectifier
G Ground, ground potential
$I_{shunt}$ Shunt current
K Coupling coefficient
$V_{in}$ Voltage source
$R_L$ Load
$S_{feed}$ Feedback signal, delay code
$V_{DC}$ Voltage (direct current)
$V_{ref}$ Voltage setpoint
$Z_s$ Input impedance
$\eta_{link}$ efficiency

The invention claimed is:

1. An input circuit for a wireless power receiver, the input circuit comprising:
an active rectifier configured to receive an AC voltage at input nodes and output a DC voltage to output nodes,
a voltage regulator connected to the output nodes,
a control structure adapted to control the DC voltage comprising
a first control loop operatively coupled to the voltage regulator and configured to control a voltage regulation operation of the voltage regulator such that the DC voltage is actively modified, and
a second control loop operatively coupled to the active rectifier and configured to control a rectifier operation of the active rectifier, wherein the first control loop operates with a faster response time than the second control loop.

2. The input circuit of claim 1, wherein the adaptation of the rectifier operation comprises the adaptation of a conduction angle of the active rectifier for controlling the DC voltage, wherein the control structure is configured to exclusively control the DC voltage by adapting the conduction angle if the DC voltage is away from a predetermined threshold.

3. The input circuit of claim 2, wherein the active rectifier is configured with input nodes for connecting the active rectifier to a receiver matching network, wherein the receiver matching network is external to the input circuit.

4. The input circuit of claim 3, wherein second control loop is configured to adapt the conduction angle of the active rectifier to control an input impedance of the input circuit connected to the receiver matching network through the input nodes.

5. The input circuit of claim 3, wherein second control loop is configured to adapt the conduction angle of the active rectifier to control an input impedance of the input circuit to zero for short-circuiting the input nodes.

6. The input circuit of claim 1, wherein the voltage regulator is adapted to actively reduce the DC voltage if the DC voltage exceeds a predetermined threshold.

7. The input circuit of claim 6, wherein the voltage regulator is provided as a shunt regulator and configured to shunt a DC current for reducing the DC voltage, wherein the first control loop is adapted to control the DC current during the voltage regulation operation if the DC voltage exceeds a predetermined threshold.

8. The input circuit of claim 1, wherein the active rectifier comprises a plurality of controllable semiconductor switches, wherein each controllable semiconductor switch is provided as a MOS active diode.

9. The input circuit of claim 1, in a wireless power receiver for a wireless power transfer system, comprising:
a load,
a receiver coil configured to receive electrical energy via inductive coupling from a transmitter device external to the wireless power receiver,
a receiver matching network configured to match an impedance of the receiver coil.

10. A wireless power receiver receiving an AC voltage from a receiver coil, comprising:
an active rectifier including controllable semiconductor components receiving an AC voltage from a receiver coil and providing a DC voltage at output nodes
a shunt voltage regulator connected between the output nodes,
a control structure configured to stabilize the DC voltage at a desired constant value, comprising
a first control loop acting on a current flowing through the shunt voltage regulator
a second control loop, slower than the first control loop, acting on a timing of the controllable semiconductor components.

11. The wireless power receiver of claim 10, wherein the controllable semiconductor components are MOS transistors.

12. The wireless power receiver of claim 10, the control structure being configured to deactivate the first control loop when the DC voltage is below a predetermined threshold.

* * * * *